Feb. 14, 1928.

C. R. HAYS 1,658,896

WHEEL PULLER

Filed Dec. 4, 1926

Inventor
Clarence R. Hays

Herbert E. Smith

By

Attorney

Patented Feb. 14, 1928.

1,658,896

UNITED STATES PATENT OFFICE.

CLARENCE R. HAYS, OF SPOKANE, WASHINGTON, ASSIGNOR OF ONE-TENTH TO ARTHUR H. CALKINS AND NINE-TWENTIETHS TO ISAAC J. BLAIR, BOTH OF SPOKANE, WASHINGTON.

WHEEL PULLER.

Application filed December 4, 1926. Serial No. 152,606.

The present invention relates to improvements in wheel pullers of the assembling tool type especially adapted for use in removing or withdrawing wheels from their spindles as used on automobiles or automotive vehicles. The device is of the screw actuated type and as an auxiliary feature is provided with a tapping pin for impact with the spindle-end in loosening the wheel from its spindle. The puller is attached to the threaded hub porton of the wheel and means are provided for protecting the threads of the hub to which the device is attached as well as for re-threading or re-forming the threads of the hub should they be worn or stripped. In its threaded attachment to the wheel hub the device of my invention provides means whereby many objectionable features now existing in wheel pullers are overcome, and the device of my invention may be applied for use with facility, manipulated in such manner as to protect the parts from marring, and then detached with equal convenience and dispatch.

The invention consists in certain novel combinations and arrangements of parts as will hereinafter be more fully pointed out and claimed.

In the accompanying drawings I have illustrated one complete example of the physical embodiment of my invention wherein the parts are combined and arranged according to the best mode I have thus far devised for the practical application of the principles of my invention, but it will be understood that various changes and alterations may be made in the exemplified structure within the scope of my claims without departing from the principles of my invention.

Figure 1:
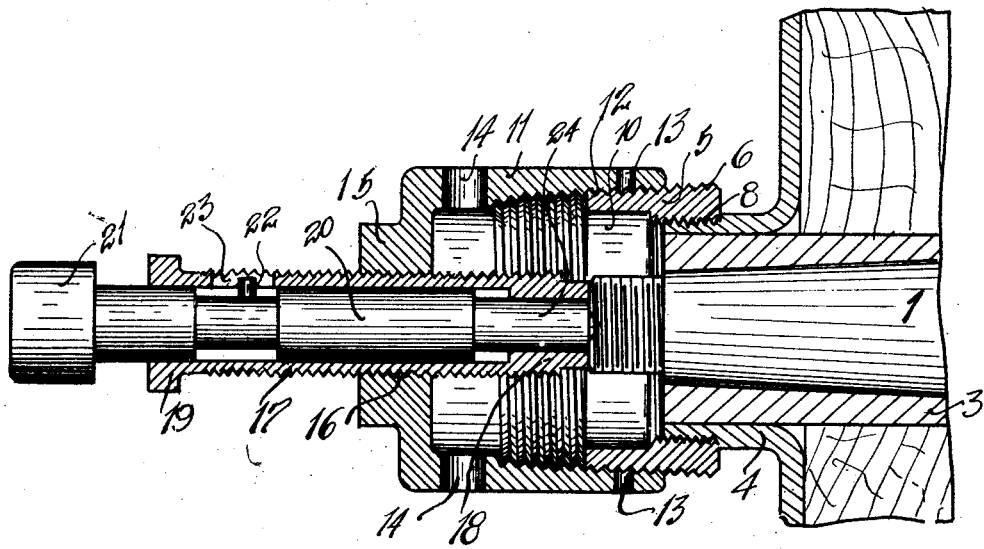
Figure 1 is a sectional detail view showing the device applied to the wheel hub and spindle preparatory to pulling the wheel from the spindle or shaft.
Figure 3:
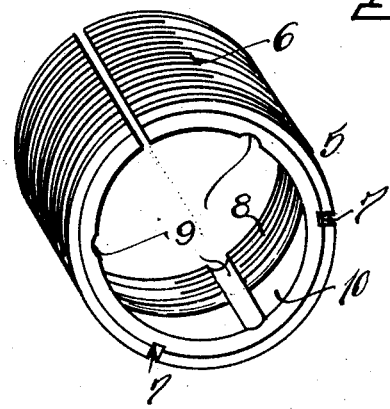
Figure 3 is a perspective view of the clamp screw-bushing employed as an element in the wheel puller.
Figure 2:
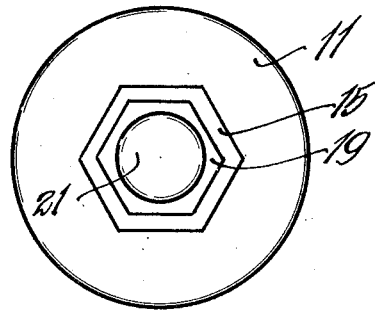
Figure 2 is an end view of the device.

In order that the general arrangement and relation of parts, as well as the utility of the puller may readily be understood I have indicated in Figure 1 the end 1 of a wheel spindle having a reduced threaded extension 2, with the hub cap and locking nut ordinarily employed removed from the wheel structure. The hub-sleeve 3 of the wheel and the threaded hub extension 4 are sufficiently disclosed to illustrate the application and use of the wheel puller or assembling tool.

One of the meritorious features of the invention is the split resilient bushing 5, which is provided with a tapered and threaded exterior 6, and longitudinally extending grooves 7 to enhance the resiliency of the bushing. At one end the bushing is fashioned with internal threads 8 for engagement with the threads on the hub extension 4, and longitudinal grooves 9 interrupt these threads in order to provide separated threading or cutting members, which when applied to threads on the wheel hub that have been marred or stripped, will re-form the marred threads by tracing over the threaded hub portion. Back of the internal, interrupted threads, the bushing is fashioned with an enlarged bore to insure properly thinned walls to permit compression of the split bushing, as indicated at 10.

The bushing is attached to the wheel hub by threading it on the extension 4 as shown, and a holder 11 in the form of a hollow cup with interior tapered thread portion 12 is screwed over the tapering, threaded exterior of the bushing, oil holes 13 being provided in the wall of the holder for admission of lubricant to the threads. The holder may be turned, by the use of a bar or rod passed transversely through holes 14 of the holder, to engage the threads of the holder with the bushing, and in turn engage the interior threads of the bushing with the hub threads, and when the holder is turned tight upon the bushing so that the latter will turn with the former, the bushing may be turned not only to attach the tool to the hub, but to re-form the threads on the hub as described.

At its outer end the holder is closed by a head 15 having a central threaded bore 16, and a tubular screw bar 17 is carried in the threaded head of the holder. The screw bar is of sufficient length to project into the holder and at its inner end is fashioned with a head 18 adapted to contact with the outer face or end of the threaded stud or extension 2 of the spindle. At its outer end the tubular screw bar is fashioned with a bolt-head 19 to which a wrench or other tool may be applied for turning the tubular screw bar in its threaded bearing of the head 15 to press the head 18 against the stud 2.

Thus with the parts of the device assembled as in Figure 1, by turning the tubular screw bar in its threaded bearing of the holder and with the head 18 pressing against the stud 2, the holder and its clamped bushing are moved relatively to the screw bar for pulling the wheel and its hub sleeve from the spindle. By inserting a bar in the hole or holes of the holder, if necessary, the holder may be retained against tendency to turn under strain from the screw bar.

As an auxiliary device in case the wheel should prove refractory, I provide a tapping pin 20 which is provided with a head 21 to receive blows or taps from a hammer. This tapping pin is carried in the tubular screw bar and is provided with a retaining pin 22 projecting laterally therefrom into a convenient slot 23 in the tubular screw bar, which pin and slot arrangement permits relative movement of the tapping pin within the screw bar but prevents displacement or loss of the tapping pin.

At its inner end 24, which is reduced to fit into the bore of the head 18 of the screw bar, the tapping pin is adapted to press against the face of the stud 2 of the spindle. Thus by light blows or taps of a hammer on the head 21 of the tapping pin the spindle may be loosened in its hub, and then the wheel puller may be used with facility to pull the wheel from the spindle.

Having thus fully described my invention, what I claim as new and desire to secure by Letters Patent is—

1. In a wheel puller, the combination with a holder having interior threads and a resilient bushing having complementary exterior threads, of a screw bar in the holder, and there being interior, interrupted threads fashioned in the bushing.

2. The combination with a split, tapered, exteriorly threaded bushing having interior, interrupted, attaching threads, of an interiorly tapered and threaded holder for the bushing, and a screw bar in said holder.

3. In a wheel puller the combination with a split bushing having a tapered exterior and threads thereon, and interior attaching threads on the bushing, of a holder having tapered interior threads for coaction with the exterior threads of the bushing, and a screw bar in said holder.

4. In a wheel puller the combination with a holder and its attaching bushing, of a tubular screw bar in the holder, and a tapping pin supported within the screw bar and movable relatively thereto.

5. In a wheel puller, the combination with a slotted, tubular screw bar, of a tapping pin within the screw bar and provided with an exterior head, and a laterally projecting pin on the tapping pin for co-action with the slotted tubular screw bar.

In testimony whereof I affix my signature.

CLARENCE R. HAYS.